May 25, 1937.  R. KICKENBUSH  2,081,334
BEDDING
Filed Jan. 7, 1935

INVENTOR.
Ray Kickenbush
BY
ATTORNEY.

Patented May 25, 1937

2,081,334

UNITED STATES PATENT OFFICE 2,081,334

BEDDING

Ray Kickenbush, Burlington, Wis., assignor to Luse-Stevenson Co., Chicago, Ill., a corporation of Illinois Application January 7, 1935, Serial No. 659

1 Claim. (Cl. 119—28)

The present invention relates to bedding suitable for use with farm stock and the use thereof in stalls.

It is advocated at the present time that dairy herds and other farm animals be comfortably housed in winter. This practice has proved highly successful in respect to dairy herds in that it has caused the cows to produce more and better milk. The same practice has been beneficial in respect to other farm animals whose health and vigor has been increased. The practice has further led to careful designing of bars for the accommodation of such animals. The present invention describes a material particularly suited for bedding farm animals while confined to stalls in a barn.

The objects of the invention include, among others, the provision of the following:

A new bedding material particularly useful for protecting farm animals from low floor temperatures and concurrently protecting them from injury from contact with hard floor surfaces;

A material that comprises suitable felt and reenforcements therefor to give it greater strength;

A unique combination of felt, reenforcing means, and waterproofing material to provide an improved stall bed for cattle or the like;

An improved stall bed in which a suitably reenforced felt or the like protected with a waterproofing lamination is disposed upon a cement floor or the like; and An improved stall in which a cow or other farm animal is provided with better bedding facilities and receives superior protection from cold floors.

These, and such other objects as may hereinafter appear, are obtained by the novel construction, unique arrangement, and improved combination of the several elements which constitute the invention, one form of which is illustrated in the accompanying single sheet of drawings, hereby made a part of this specification, and in which.

Like reference characters are used to designate similar parts in the drawing and in the following description.

Figure 1:
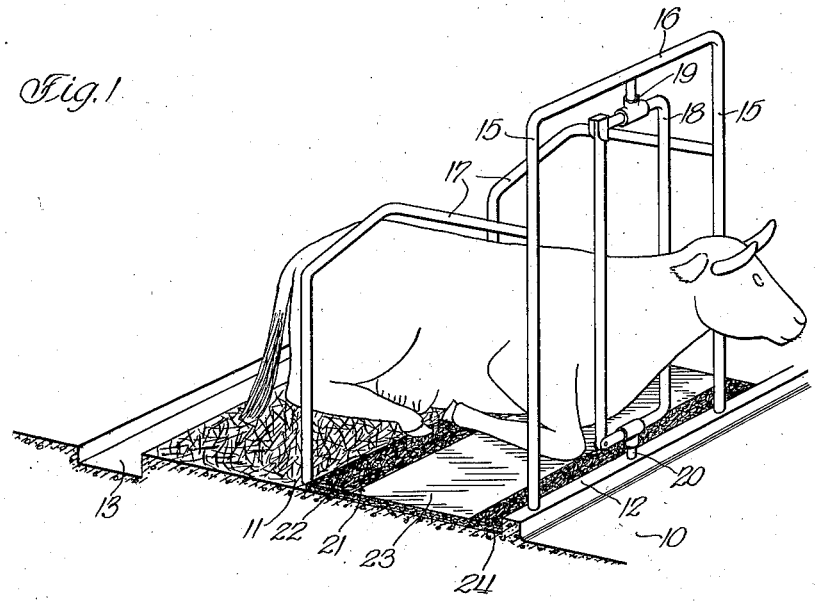
Figure 1 is a perspective view of a single stall in a modern cow barn having as a part thereof a protective pad or mat of the character shown in Figures 2 and 3.

Floors of modern barns are usually of concrete. The floor illustrated in Figure 1 is of such material and is of a more or less standard contour. At the front of the cow shown in Figure 1, the floor comprises a feed trough 10 which may be of any suitable width and which may be elevated or level with the main floor and which may have a curved bottom instead of the flat bottom illustrated.

That part of the barn floor shown in Figure 1 and upon which the pad and some loose bedding are disposed is called a platform and is designated 11. Between the feed trough 10 and the platform 11 is a curb 12. To the rear of the platform 12 is a gutter 13 which may be of any suitable width and depth.

The platform 11 is of suitable depth from curb 12 to gutter 13 and for cows it is generally not less than sixty to sixty-five inches deep. The platform may be deeper if desired.

In the curb 12, certain rails or stall forming members are mounted. The rails may be of any suitable form, those illustrated being of a well known type. The rails include uprights 15 defining the end of each stall and a top rail 16 connecting the uprights 15. Partition rails 17 are attached to the uprights 15 which are anchored in curb 12. The stall partition rails 17 are suitably anchored in the platform 11.

A stanchion 18 is pivotally mounted in a bearing 19 in the top rail 16 and in a second bearing 20 anchored in the curb 12. The stanchion 18 permits of the cow (or other animal) turning her head, lying down, reaching for feed in the trough 10, and maneuvering in the stalls within the limits defined by the stall partitions 17, while at the same time preventing her from leaving the stall or completely turning around therein. At all times, the movement of the front part of the cow's body is limited, the forward and backward movement of the cow in the stall being reasonably restricted. In this manner, the cow is kept upon the pad or mat 21. It has been conventional to use the type of stall shown in cow barns for some time past. Until the present invention, it was conventional to cover the entire platform 11 with a bedding comprising straw, shredded corn stalks, wood shavings, and the like. It has been found that a cow so confined and so bedded has from time to time brushed the bedding from under her front legs and body. When this occurs, the front part of the cow's body which contains her vital organs has become exposed to the coldness of the concrete forming the platform. The cows have thus been made uncomfortable and many have suffered from the ills generally peculiar to winter weather.

A cow drops onto her knees to lie down. Many cows, dropping upon their knees to lie down on a concrete platform have bruised or otherwise damaged their front knees, resulting in enlarged knees and other lameness. Injury to the knees has occurred when but small sections of loose bedding have been displaced. The coldness of the concrete floor on which the cow has rested has interfered with the milk production of many cows, reducing it materially.

The present invention has overcome the bedding problem for farm animals and provides a bedding for cows and other animals which will protect them from the coldness of the concrete floor as well as injury therefrom.

Figure 2:
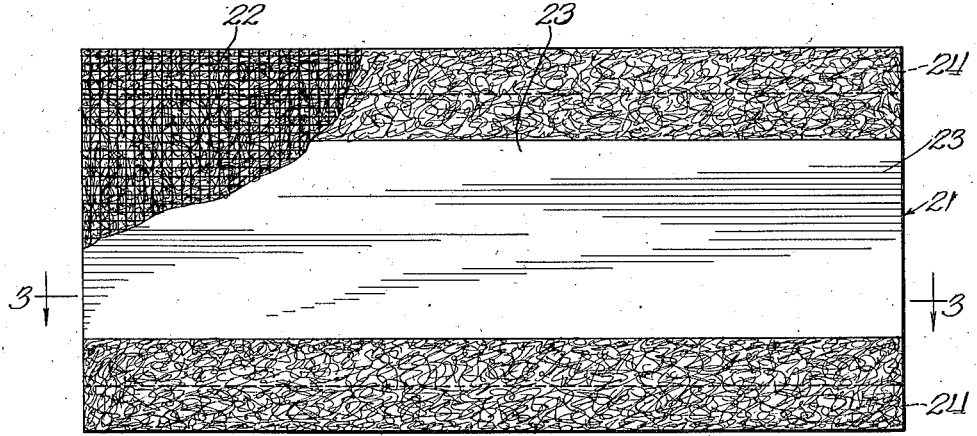
Figure 2 is a plan view of the mat or pad shown in Figure 1, parts of the mat or pad being broken away to illustrate the texture of the mat or pad.
Figure 3:
Figure 3 is a transverse section on the line 3—3 of Figure 2.

The mat or pad 21 shown in Figures 1, 2 and 3 is more sanitary than the loose bedding formerly used. This results in cow's producing milk having a reduced bacteria count.

The mat or pad 21 shown in Figures 1, 2 and 3 may comprise suitable hair felt or the like. Hair felt and other material of a like nature possess a high insulation value. A concrete floor can not transmit its coldness or chill to a cow lying upon a pad or mat 21 of the type shown because of its insulating properties, hence the body of the cow is warmer. A cow so protected enjoys better health and is more efficient as a milk producer.

The mat or pad 21 may comprise only hair felt or the like. It may be reenforced by layers of burlap 22 or other sheet material. One layer of burlap 22 may be used. Preferably two or more are employed. The hair felt, which may be made of cattle hair, and the burlap are formed into a body or sheet of suitable thickness. The manufacture of the felt may be by the needle or punched process. The material may be in strips of selected width of which pad or mat 21 is a section.

A felt pad or mat may be so produced that it is quite strong. The burlap will make it stronger. Its texture is such that it is not torn by a cow's hoofs. The pad or mat 21 is of sufficient thickness that it is an effective insulator. When of such thickness, it also acts as a cushion protecting a cow from bruise or cut as she drops to her knees preliminary to lying down.

The mat or pad 21 may be of other material than cattle hair. Other hairs may be employed. Other material having a high insulating value may be substituted for hair. As stated previously, the texture of the material of the pad or mat 21 should be sufficiently strong that it is not readily disintegrated or pulled apart by the hoofs of the cow. At the same time, the pad or mat should not be so dense that it loses its insulating value or fails to serve as a cushion. The material of the pad may have different surfaces on opposite sides, as for example, one relatively smooth and the other rough.

When the material has a smooth and a rough side the smooth side is used as the top surface. The pad or mat 21 may be used with or without a coating of waterproofing material as desired. It is preferred that a thin lamination of waterproof material be used on the top surface.

In the drawing, the layer of waterproofing 23 is shown extending longitudinally of the main body of the material and from end to end of the pad or mat 21 and occupying an area at the midlde of the strip equal to one half or more of the total area of the pad or mat. When desired, the lamination 23 may be enlarged to extend over the entire top surface of the pad or mat 21.

The lamination 23 is of rubber or any other suitable material. A rubber composition is desirable as it may be sprayed on rapidly and inexpensively. The thickness of the lamination need not be great. Lamination 23 adds further strength to the mat or pad 21 and provides firm resistance to any destructive action by the cow's hoofs.

A rubber latex high in solids and which will dry quickly so as not to be sticky and which will remain flexible over a long period of time has been found highly suitable for lamination 23. Such a latex may be sprayed onto the top surface of the mat or bed 21 to which it readily adheres. The burlap layers may be spaced as shown or otherwise spaced as desired.

A pad or mat 21 is installed in a stall after the platform 11 has been thoroughly cleansed and dried. Two spaced apart strips of suitable adhesive material 24 are spread thereover to adhere to the pad from its edges inwardly. The adhesive may be applied over the front and back edges of the mat or pad instead of the concrete. The adhesive is in a rather broad band and may cover from the front and back edges of the mat or pad as much as twenty per cent of the total area of the pad.

In some cases, it may be found desirable to apply adhesive over the entire under surface of the pad or mat but this is ordinarily not necessary. Sometimes the ends of the pad may be adhesively secured as are the edges of the illustrated pad, that is, with broad bands of adhesive. With a pad secured in place in any one of three manners indicated, or with the pad loosely therein, the stall is ready for use.

Loose bedding of straw, shredded corn stalks, sawdust or the like is spread on the platform at the rear of the pad or mat when the mat does not cover the entire stall platform as it may in some instances.

Such loose bedding, when used, is made up and changed in the usual fashion from time to time as is now the common practice. The pad or mat 21 is kept clean by brushing it at the time that the loose bedding is changed. The pad or mat 21 may be used continuously over an extended period of time. A covering of latex or rubber, as herein described, makes the mat or pad more readily cleansable.

A cow, at all times, has her front feet on the pad or mat when in standing or reclining position. When the cow desires to lie down, she drops to her front knees. Her knees are protected from the concrete by the pad. She then drops to a reclining position with the front part of her body resting on the pad. No injury may come to the cow's knees when she drops to them because of the cushioning effect of the pad. When the cow reclines on the mat, a large proportion of her body rests upon the mat. The portion resting on the mat or pad includes the major vital organs.

The pad or mat 21 prevents cold from the platform penetrating to the cow's body. The result is that the cow is comfortable, warmer and in better physical condition to produce milk. If preferred, the bedding may be used over the entire stall and when less than the entire stall is covered, it may be placed in a position different from that shown. The bedding may be used for horses, for sheep, or for other animals, either in full lengths or in half lengths.

Substitutes for cattle hair or goat hair of which the pad is preferably made include jute or fiber and a number of other materials.

The usual width of the bedding, that is from front to back, is thirty-six to forty inches and its back edge is thirty-three to thirty-six inches from the edge of the manger.

A greater part of the diseases which originate in a cow stall are eliminated by the present mat or pad with a resulting favorable decrease in the bacteria count in the milk. The cattle hair that is used in the felt pad or mat is clean and deodorized and it is sterilized that it may not carry disease germs.

The total cost of bedding a cow over a season is much reduced by the use of the mat or pad 21 for the amount of loose bedding required during the season is vastly reduced.

The adhesive used preferably is of a damp-proof type. Such adhesive prevents moisture from coming up through the bedding from the concrete floor.

Where the bedding is used over the entire stall, it eliminates the possibility of distributing foul weed over farm lands, a highly destructive result of the usual form of loose bedding. If the pad or mat is used over but a part of the stall, it reduces the possibility of carrying such foul weeds to a minimum.

What is claimed as new and is desired to be secured by Letters Patent of the United States is:

In a bovine animal stall, a stall platform having thereon an insulating animal bedding pad formed of felt disposed only over that portion of the stall platform normally occupied by the front half of the animal and having on the remaining portion thereof another bedding material.

RAY KICKENBUSH.